Dec. 15, 1936.  L. F. MOODY  2,064,313
HYDRAULIC POWER APPARATUS
Filed Nov. 22, 1933   6 Sheets-Sheet 1

Dec. 15, 1936.  L. F. MOODY  2,064,313
HYDRAULIC POWER APPARATUS
Filed Nov. 22, 1933  6 Sheets-Sheet 5
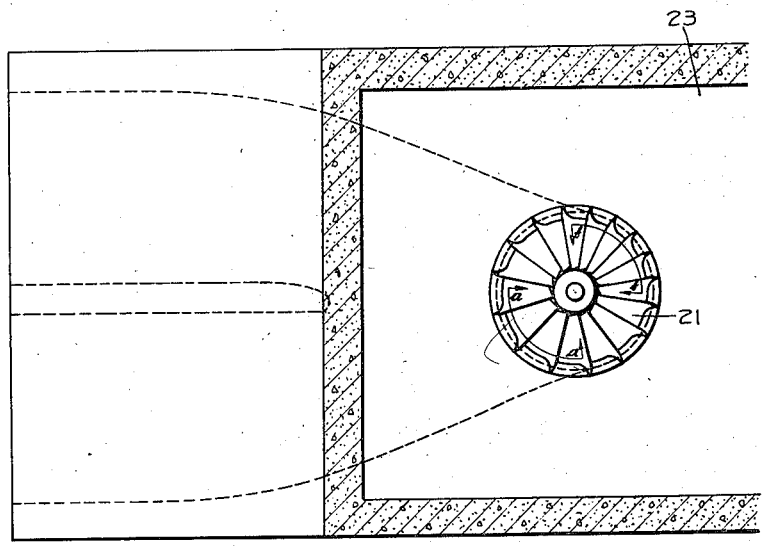
Fig. 8
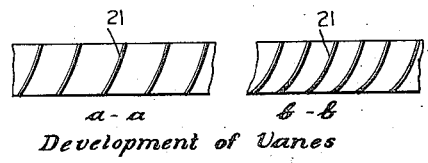
Development of Vanes
Fig. 9
Fig. 7
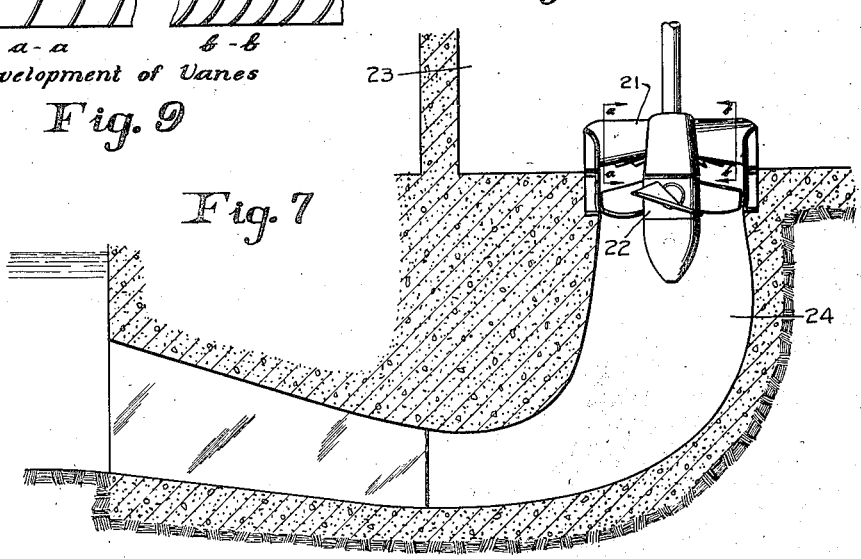
INVENTOR
Lewis F. Moody
BY
Edward _____
ATTORNEY Dec. 15, 1936.　　　　L. F. MOODY　　　　2,064,313
HYDRAULIC POWER APPARATUS
Filed Nov. 22, 1933　　　6 Sheets-Sheet 6

A—A

B—B

Development of vanes

INVENTOR
Lewis F. Moody
BY
Edward C. Hathaway
ATTORNEY

Patented Dec. 15, 1936

2,064,313

UNITED STATES PATENT OFFICE 2,064,313

HYDRAULIC POWER APPARATUS

Lewis Ferry Moody, Princeton, N. J.

Application November 22, 1933, Serial No. 699,229

18 Claims. (Cl. 253—118)

This invention relates particularly to hydraulic reaction turbines and to centrifugal and propeller type pumps in which the entrance or discharge passages, or both, are not completely symmetrical about the axis of the runner or revolving element. The limitations required by the arrangement of the installation and the space restrictions in hydraulic power plants and pumping plants frequently require that the flow into or out of the runner must be sharply turned through substantially a right angle, usually by means of an elbow or bend in the conduit. When, as is often the case, this elbow is closely adjacent to the runner, as in many turbine draft tubes and pump discharge pipes, the flow of water through the runner and adjacent guide vanes or diffusion vanes is no longer perfectly symmetrical about the runner axis, but becomes distorted to some extent. The prevailing practice is to ignore this effect or tendency in the design of guide vanes or diffusion vanes, which are formed to suit assumed uniform conditions on all sides of the axis.

It is an object of this invention to take account of this condition, and instead of employing uniform angles and openings of guide or diffusion vanes at all points around the periphery of the turbine or pump on the assumption that uniform flow conditions will exist or can be forced to exist, the angles and passage openings of the guide vanes or diffusion vanes are regularly and progressively varied in passing circumferentially around the shaft.

In an efficient elbow draft tube or pump discharge elbow the primary flow should not part from the inner surface of the bend leaving a region of eddies, backflow or vapor pockets, and in well-designed elbows the flowing stream can be kept in contact with the walls. When this condition is secured, the hydrodynamic analysis of the flow is based on the flow forming part of a vortex in which the velocity varies nearly in inverse proportion to the radial distance from the center of curvature of the elbow; that is, the static pressure is least and the velocity is highest on the inner surface of the bend and the static pressure is highest and the velocity is lowest on the outer surface. Conditions are complicated when in addition to the motion of the water along the conduit it also possesses large "whirl components" about the runner axis, but the above tendency still exists as far as the axial or longitudinal velocity components are concerned.

This invention contemplates using steeper or more axial directions for the guide vanes or diffusion vanes, and larger openings between them, in the neighborhood of the inner side of the elbow, and more tangential directions and smaller openings at or near the outer side of the elbow, so that one side of the turbine or pump will conform to and accommodate higher axial components of velocity than the other as dictated by the natural and most efficient velocity distribution in the elbow. The degree of variation is most accentuated and the effects are more pronounced when the elbow is relatively close to the runner and guide or diffusion vanes and when the axial velocity of flow is high, as in high specific speed Francis and propeller turbines and in propeller pumps.

Other objects and results will become apparent in the following description and figures:

Fig. 7 shows in sectional elevation a propeller turbine with axial-flow fixed guide vanes instead of movable guide vanes;

Fig. 8 is a plan view of the turbine of Fig. 7;

Fig. 9 is a fragmentary developed cylindrical section on lines a—a and b—b of Fig. 7 through the guide vanes;

Figure 1:
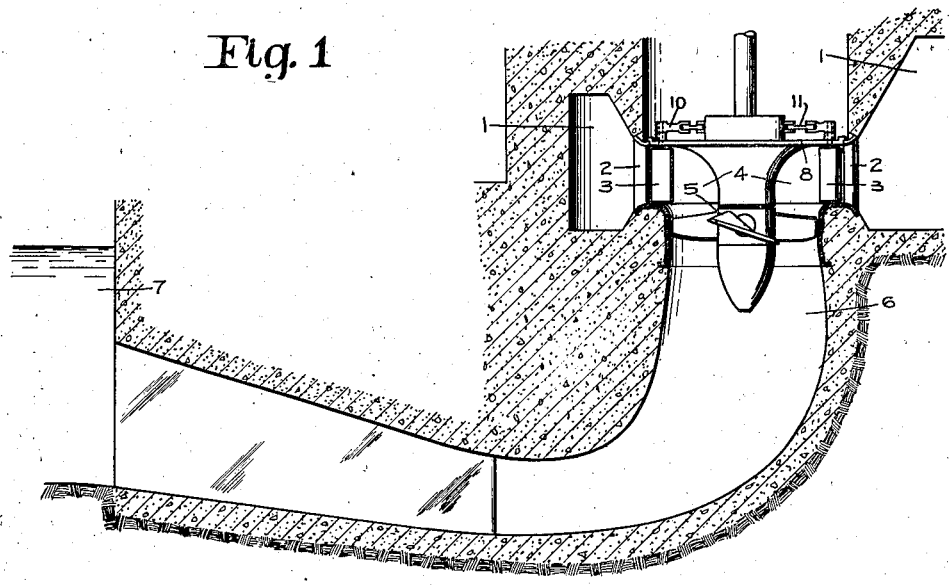
Fig. 1 shows a sectional elevation of a propeller type turbine with elbow draft tube.

In the turbine of Fig. 1 the water from the forebay enters the volute casing 1, passes between the stay vanes 2 and the movable guide vanes 3, by which it is given a tangential or whirl component of velocity about the axis and the distribution of flow around the circumference is controlled and the total quantity of flow is regulated, then turns in the transition space 4 from radial to axial direction of flow and passes through the propeller type runner 5 having a small number of relatively flat unshrouded blades pitched at a small angle to their direction of motion. From the runner the water flows into the decelerating draft tube 6 of elbow construction, preferably formed with decreasing width in the plane of the drawing in passing around the curved portion, while increasing in width laterally; after which the water discharges through the nearly horizontal discharge portion of the draft tube into the tailrace 7. The runner 5 may have either fixed or angularly adjustable blades.

Figure 2:
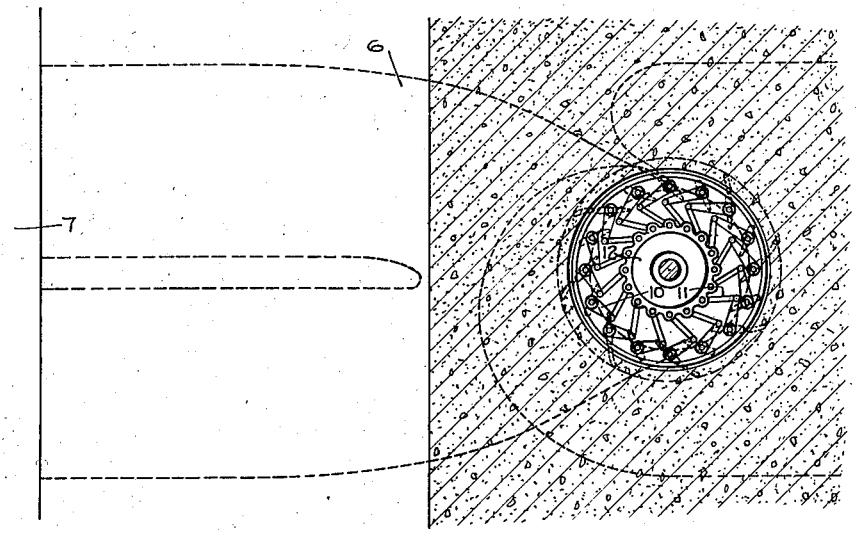
Fig. 2 is a plan view of the turbine of Fig. 1.
Figure 3:
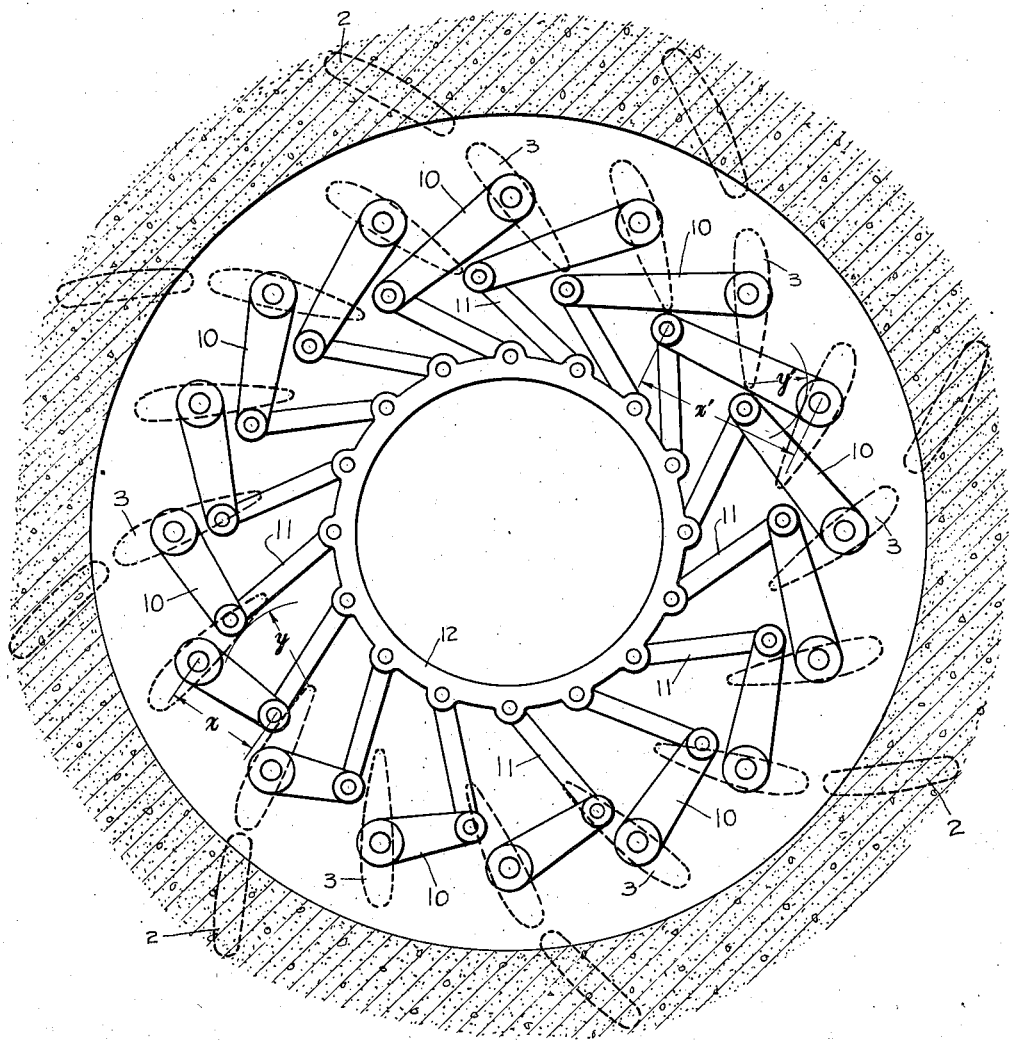
Fig. 3 is an enlarged view of the operating mechanism for the guide vanes of the turbine of Figs. 1 and 2, showing the guide vanes in dotted lines.

Fig. 2 is a horizontal section through the concrete above the casing, looking down on the turbine head cover 8 at the bottom of the turbine pit 9. This view shows the operating mechanism for adjusting the guide vanes 3 to regulate the output and speed of the turbine. This mechanism is more clearly shown in the enlarged view, Fig. 3. The guide vanes are turned by levers 10, links 11 and operating ring 12, which in turn is actuated by hydraulic cylinders and pistons (not shown). By providing levers of varying length $x$, the clear opening $y$ between successive vanes is altered progressively around the periphery of the turbine.

When the operating ring 12 is turned in the clockwise direction, all the guide vanes 3 are brought into a nearly tangential position so that they all come into simultaneous contact with each other and all then occupy identical angular positions with respect to the tangential direction. As the operating ring is then turned counterclockwise, the vanes having the short levers such as $x$ are turned through a greater angle than those having levers of greater length as at $x'$, so that the openings such as $y$ are greater than those such as $y'$. Other mechanical methods of varying the angular motion may be used, such as varying angularity of the links 11, variation of radial positions of pins on operating ring 12, etc., but the method shown is simple and effective. It will usually be preferable not to provide the largest and smallest openings $y$ and $y'$ exactly in the central plane of the elbow, the plane of Fig. 1, but somewhat in advance of these positions so that the flow lines through these largest and smallest openings will reach the central plane on issuing from the runner into the draft tube. By this means the flow at entrance to the draft tube can be distributed approximately in the natural conditions in a well-formed elbow passage having minimum loss of head. The variation between $y$ and $y'$ is somewhat exaggerated in the view for the purpose of clearness; it will be understood that a large distortion of the flow while benefitting the draft tube conditions would react unduly on the runner, and therefore a compromise must be effected to give the maximum combined or overall efficiency of the unit.

Figure 4:
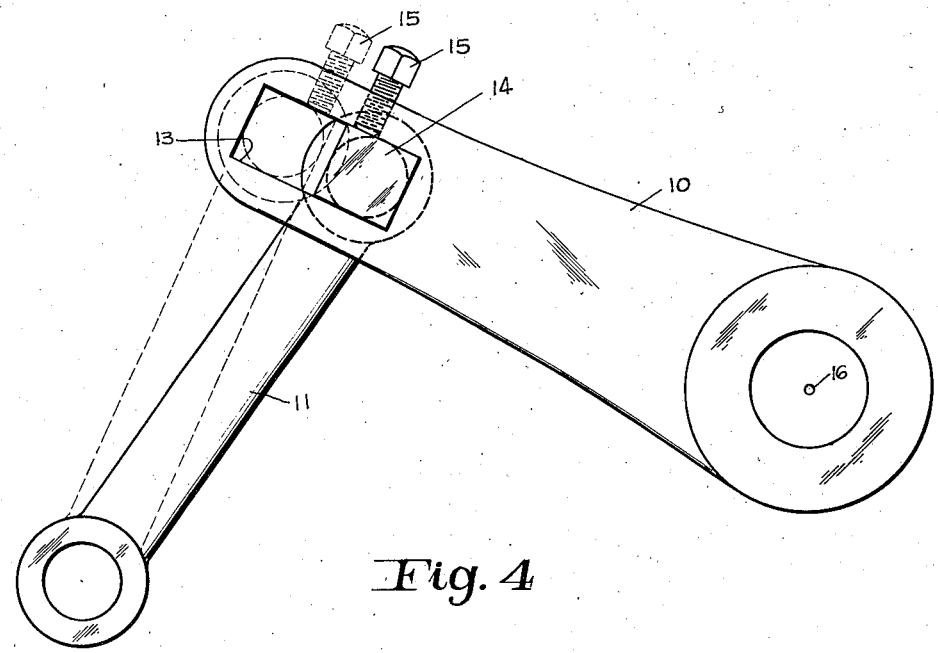
Figs. 4 and 5 show modified forms of the vane levers and links of Fig. 3, providing an adjustable feature for the variation of vane angles and openings.
Figure 5:
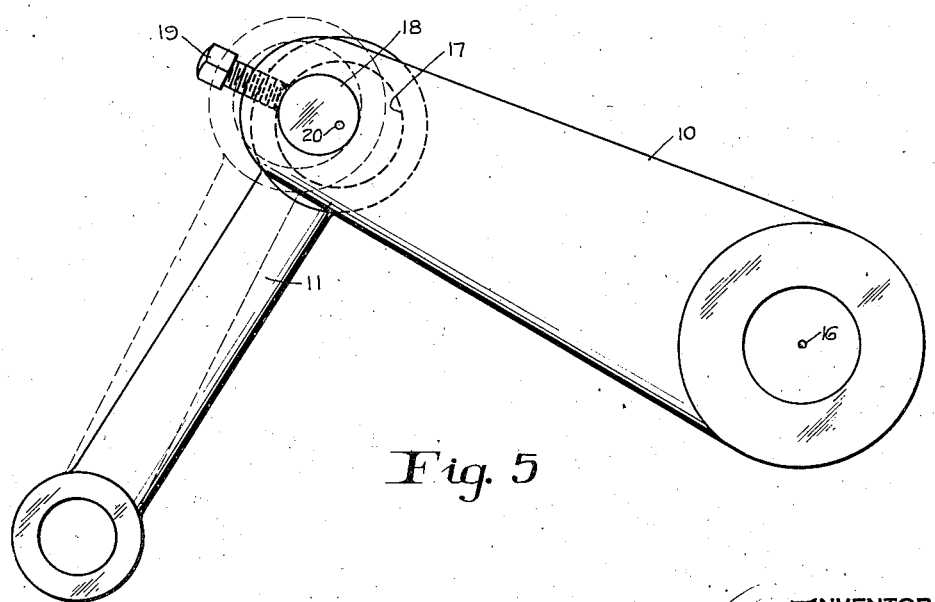

To facilitate the obtaining of the optimum degree of variation, Figs. 4 and 5 show means for adjusting the effective lengths of the guide vane levers. In Fig. 4 the lever (having two webs one below the other) has rectangular slots 13 in which the squared ends 14 of the link pin are held by set screws 15 in any desired position. If all the pins are clamped at the same radial distance from the guide vane and lever axis 16, the levers of all the vanes will have the same effective length and all the guide vanes will turn through identical angles, as in the ordinary turbine. By adjusting successive levers for progressively increasing effective length around half the circumferences and progressively decreasing again through the other half, the desired variation of vane angle and opening may be secured, and the degree of variation may be fixed at any desired value within the limit set by the length of slot. In Fig. 5 a similar effect is secured by providing the link pin 17 with eccentric extensions 18 carried in holes in the lever, so that by rotating the pin in the hole and then clamping it with the set screw 19, any desired effective length of the lever may be secured as measured between the axis 20 of the pin and the axis 16 of the lever, this adjustment being limited by the amount of eccentricity of the link pin.

In the turbine of Fig. 1 the draft tube has relatively gradual curvature and the elbow portion is somewhat removed from the runner by a transition space. In this case only a moderate degree of difference between the widest guide vane opening $y$ on one side and the smallest $y'$ on the opposite side will in general be required. When due to limited excavation or axial space available the elbow must be more sharply curved and placed close to the runner, a greater difference between $y$ and $y'$ is needed, particularly when the specific speed of the turbine is very high. In most cases an excess of $y$ over $y'$ not exceeding about 5% will probably be sufficient, the exact figure however depending on the particular design of runner and water passages.

Figure 6:
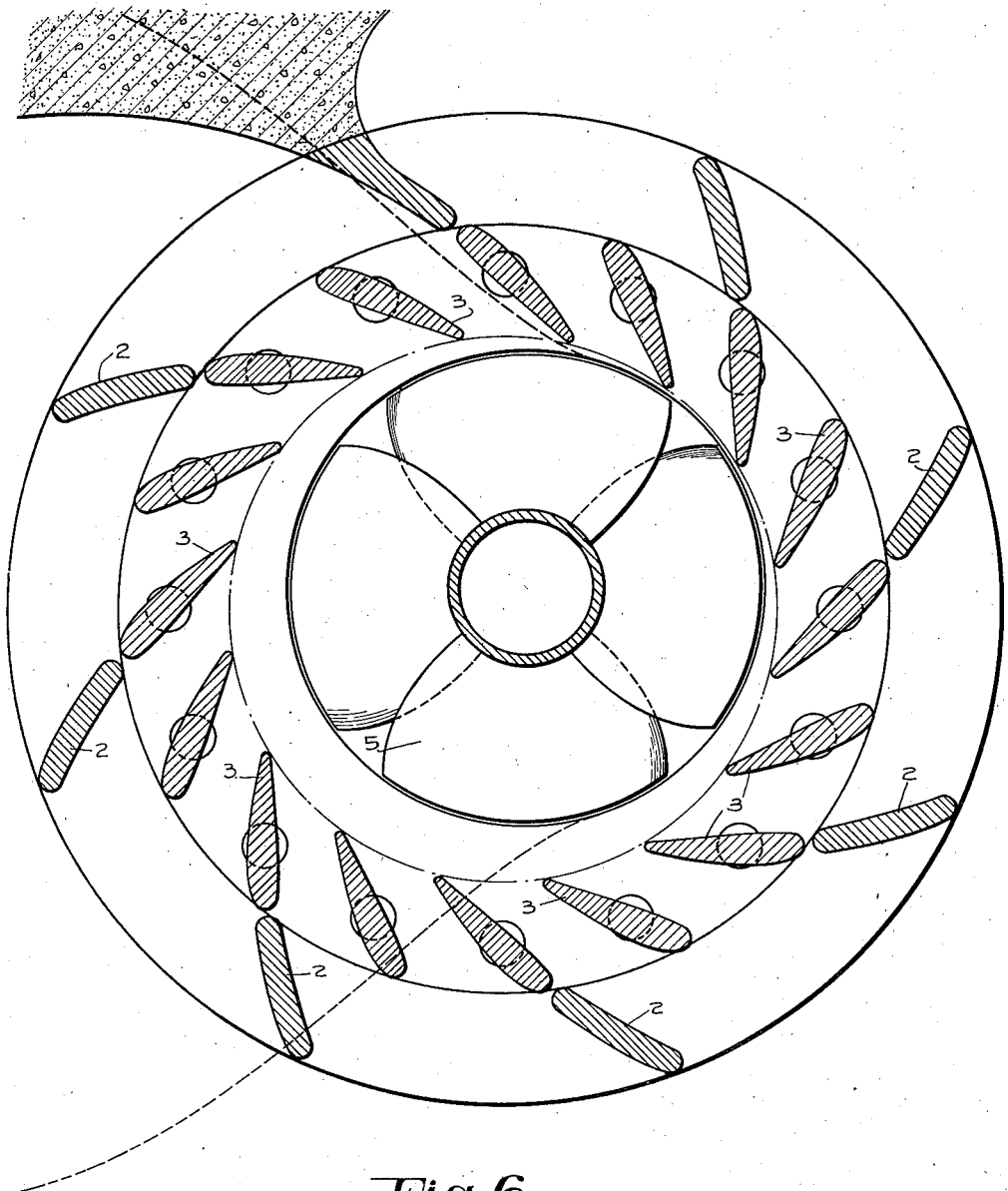
Fig. 6 shows an alternative method of caring for the unsymmetrical flow by arranging the guide vanes of Figs. 1 and 2 eccentrically with respect to the runner instead of varying their angles and openings.
Figure 11A:
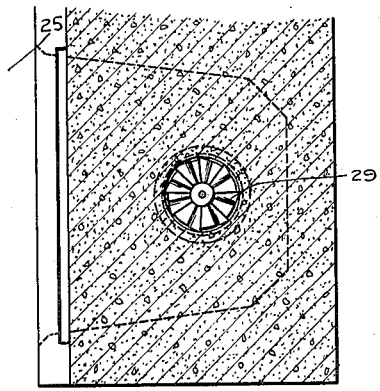
Figs. 11a and 11b are sectional plan views of the pump of Fig. 10 on lines A—A and B—B of Fig. 10.
Figure 11B:
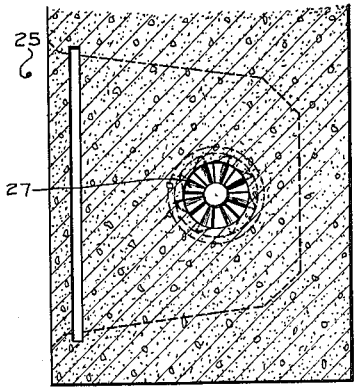

In Fig. 6 is shown an alternative method of varying the effective guide vane angles around the periphery of the vane circle. Here the vanes are placed at equal angles, and with equal openings between them, but the guide vane circle is displaced in an eccentric position with respect to the turbine axis. This affects both the axial velocity distribution and the distribution of whirl components around the axis of the turbine and permits considerable flexibility in fixing the direction and magnitude of the velocity entering and leaving the runner at different points around the runner space. The vane levers in this case would be of uniform length and the operating mechanism concentric with the guide vanes and eccentric to the runner. A combination of the Fig. 3 and Fig. 6 methods could be used if desired.

Figs. 7 and 8 show a propeller turbine having fixed, non-adjustable guide vanes 21 of the axial flow type. The runner 22 is of the propeller type, preferably with angularly adjustable blades for regulation. The turbine is shown in open flume setting, the water entering through the open rectangular flume 23 and discharging through the elbow draft tube 24. The guide vanes, as shown in developed cylindrical section $a$—$a$ and $b$—$b$, have varying angles around the periphery. The spacing of the guide vanes is also shown as varying, although this is not so essential. Where the axial velocity component is smaller, as at $b$—$b$, on the outer side of the elbow, the guide vanes are slightly more tangential at their discharge ends and therefore deflect the water relatively more than at $a$—$a$, so that closer spacing of the vanes may be adopted.

Figure 10:
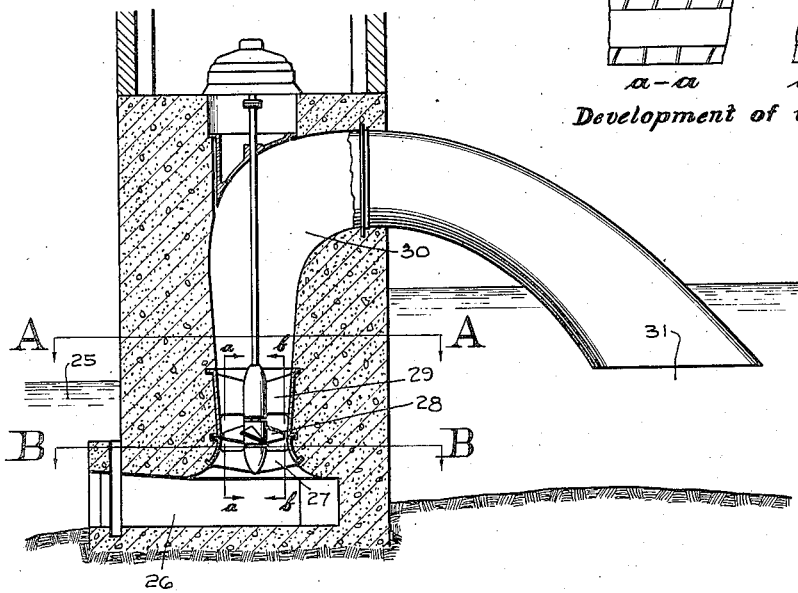
Fig. 10 is a sectional elevation of a propeller type pump with elbow discharge conduit.
Figure 12:
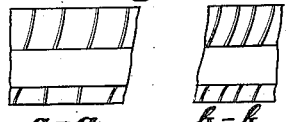
Fig. 12 is a fragmentary developed cylindrical section of the guide vanes and diffusion vanes of Fig. 10 on lines a—a and b—b' of Fig. 10.

In Fig. 10 is shown an axial flow propeller pump. The water enters from the sump 25 into the suction chamber 26, then passing vertically upward through the fixed guide vanes 27, a transition space, the propeller type runner or impeller 28, and another set of fixed vanes 29 acting as diffusion vanes to decelerate the flow. The runner may have either fixed or angularly adjustable blades. From the vanes 29 the water enters the decelerating discharge elbow 30 and is finally discharged at 31. In order to accommodate the tendency of the flow in the elbow, the diffusion vanes are somewhat varied in their entrance angles around the circumference to discharge relatively more water at b—b than at a—a, giving a somewhat higher axial velocity at the innermost wall of the elbow. With the considerable distance between runner and elbow proper shown in Fig. 10 and with the straight flaring passage interposed between them, the circumferential variation of the diffusion vane angle would be relatively small, but in cases where the elbow is sharply curved and is immediately adjacent to the diffusion vanes, a greater degree of variation would be used. The suction vanes in some cases may also be given an angle to the axial direction at their discharge ends, and this angle may be varied circumferentially. The developed cylindrical section a—a and b—b in Fig. 12 shows an angular variation of both guide vanes and diffusion vanes, and also a variation in spacing similar to that described in connection with Fig. 9. In some installations the guide vanes 27 are omitted.

The principles described herein may be applied to the pumping of air under relatively low heads, as in fans and blowers, in a manner which should be obvious from the description of the application to hydraulic pumps handling water. Other applications and modifications within the spirit of the invention will occur to those skilled in the art.

I claim:

1. In a rotary hydraulic machine having a runner, a circumferentially arranged set of guide vanes on the inlet side of the runner disposed so as to direct and control the distribution of flow to said runner, and a laterally curved discharge passage receiving the flow from said runner for deflecting the axial components of the flow into a lateral direction with respect to the axis of runner rotation at a point relatively near said runner, said guide vanes being arranged with progressively varying angles and openings whereby larger openings are provided between successive vanes on one side of the runner axis than at a diametrically opposite point on the opposite side of said axis.

2. In a rotary hydraulic machine having a runner, a circumferentially arranged set of guide vanes on the inlet side of the runner disposed so as to direct and control the distribution of flow to said runner, and a laterally curved velocity-decelerating discharge passage receiving the flow from said runner for deflecting the axial components of the flow into a lateral direction with respect to the axis of runner rotation at a point relatively near said runner, said guide vanes being arranged with progressively varying angles and openings whereby larger openings are provided between successive vanes on one side of the runner axis than at a diametrically opposite side on the opposite side of said axis.

3. In a rotary hydraulic machine having a runner, a circumferentially arranged set of guide vanes on the inlet side of the runner disposed so as to direct and control the distribution of flow to said runner, and a laterally curved conduit adjacent to said runner receiving the flow passing therethrough, said conduit turning the flow through substantially ninety degrees with respect to the direction of the axis of runner rotation at a point relatively near said runner, said guide vanes being arranged with progressively varying angles and openings whereby larger openings are provided between successive vanes on one side of the runner axis than at a diametrically opposite point on the opposite side of said axis.

4. In a hydraulic turbine having a runner, a circular series of guide vanes in the flow to said runner, and a conduit adjacent to said runner and guide vanes, said conduit turning the flow through substantially ninety degrees with respect to the direction of the axis of runner rotation at a point relatively near said runner, said vanes being arranged so that successive vanes are inclined at progressively increasing and decreasing angles with respect to radial lines drawn from corresponding points in said vanes to the runner axis, in passing around the guide vane circle.

5. In a hydraulic turbine having a runner, a circular series of guide vanes in the flow to said runner, and a conduit adjacent to said runner and guide vanes, said conduit turning the flow through substantially ninety degrees with respect to the axis of runner rotation at a point relatively near said runner and guide vanes, said guide vanes having an eccentric location by which the center of the guide vanes circle is placed eccentrically with respect to the axis of runner rotation, thereby providing progressively increasing and decreasing distances of successive guide vanes from said runner axis.

6. In a hydraulic turbine or pump having a runner, a circular series of guide vanes adjacent to the runner, and a decelerating conduit of elbow formation located relatively near to said runner and guide vanes for the flow passing therethrough, the inner ends of said guide vanes having as a group a non-symmetrical arrangement with respect to the runner axis and the successive vanes being inclined at progressively increasing and decreasing angles with respect to radial lines drawn from corresponding points in said vanes to the runner axis.

7. In a high specific speed turbine or pump having a runner, a circular series of stationary vanes adjacent to the runner, all of said vanes being of substantially the same form, and a velocity-decelerating discharge passage for the flow through said runner and vanes, said passage turning the flow through substantially ninety degrees with respect to the direction of the axis of runner rotation at a point relatively near said runner and vanes, and said stationary vanes having a non-uniform arrangement by which larger openings are provided between successive vanes on one side of the runner axis than at a diametrically opposite point on the opposite side of said axis.

8. In a propeller type turbine having a runner with angularly adjustable blades all of which have substantially the same form, a circular series of guide vanes spaced from said runner to provide a transition space therebetween, and a velocity-decelerating draft tube turning the flow through substantially ninety degrees from the direction of the axis of runner rotation at a point relatively near the runner, said guide vanes having a non-uniform setting by which progressively varying openings are provided between successive vanes at different points in the vane circle.

9. In a hydraulic turbine having a velocity-decelerating draft tube turning the flow through substantially ninety degrees, a runner, and a circular series of pivotally adjustable guide vanes adapted to be closed against each other in identical angular positions with respect to a radius drawn from the runner axis to each vane, means for simultaneously opening said vanes by angular movement and providing greater angular movement for the vanes on one side of the runner axis than for those on the diametrically opposite side and providing progressively increasing and decreasing widths of opening between adjacent vanes at successive points around the vane circle.

10. In a hydraulic turbine having a velocity-decelerating draft tube turning the flow through substantially ninety degrees, a runner, and a circular series of pivotally adjustable guide vanes adapted to be closed against each other in identical angular positions with respect to a radius drawn from the runner axis to each vane, means for simultaneously opening said vanes by angular movement and providing greater angular movement for the vanes on one side of the runner axis than for those on the diametrically opposite side and providing progressively increasing and decreasing widths of opening between adjacent vanes at successive points around the vane circle, and adjustable means for altering the degree of variation of the angles of said vanes and the openings therebetween.

11. In a hydraulic turbine having a velocity-decelerating draft tube turning the flow through substantially ninety degrees, a runner, and a circular series of pivotally adjustable guide vanes adapted to be closed against each other in identical angular positions with respect to a radius drawn from the runner axis to each vane, means for operating said vanes consisting of levers turning with said vanes, links attached to the levers, and an operating ring attached to the links, said levers for successive vanes having progressively changing lengths in passing around the vane circle, thereby securing progressively increasing and decreasing widths of opening between adjacent vanes when the operating ring is moved to open said vanes.

12. In a hydraulic turbine having a velocity-decelerating draft tube turning the flow through substantially ninety degrees, a runner, and a circular series of pivotally adjustable guide vanes adapted to be closed against each other in identical angular positions with respect to a radius drawn from the runner axis to each vane, means for operating said vanes consisting of levers turning with said vanes, links attached to the levers, and an operating ring attached to the links, said levers for successive vanes having progressively changing lengths in passing around the vane circle, thereby securing progressively increasing and decreasing widths of opening between adjacent vanes when the operating ring is moved to open said vanes, and the effective lengths of said levers being adjustable.

13. In a hydraulic turbine having a velocity-decelerating draft tube turning the flow through substantially ninety degrees, a runner, and a circular series of pivotally adjustable guide vanes adapted to be closed against each other in identical angular positions with respect to a radius drawn from the runner axis to each vane, means for operating said vanes consisting of levers turning with said vanes, links attached to the levers, and an operating ring attached to the links, said levers for successive vanes having progressively changing lengths in passing around the vane circle, thereby securing progressively increasing and decreasing widths of opening between adjacent vanes when the operating ring is moved to open said vanes, and the effective lengths of said levers being adjustable by means of slidable link pins.

14. In a hydraulic turbine having a velocity-decelerating draft tube turning the flow through substantially ninety degrees, a runner, and a circular series of pivotally adjustable guide vanes adapted to be closed against each other in identical angular positions with respect to a radius drawn from the runner axis to each vane, means for operating said vanes consisting of levers turning with said vanes, links attached to the levers, and an operating ring attached to the links, said levers for successive vanes having progressively changing lengths in passing around the vane circle, thereby securing progressively increasing and decreasing widths of opening between adjacent vanes when the operating ring is moved to open said vanes, and the effective lengths of said levers being adjustable by means of eccentric link pins.

15. In a hydraulic turbine or pump having a runner, a circular series of guide vanes adjacent to the runner, and a decelerating conduit of elbow formation located relatively near to said runner and guide vanes for the flow passing therethrough, successive ones of said vanes in their portions nearest the runner being inclined with respect to the runner axis at progressively increasing and decreasing angles with respect to radii drawn from each vane to the runner axis.

16. In a hydraulic turbine or pump having a runner, a circular series of guide vanes adjacent to the runner, and a decelerating conduit of elbow formation located relatively near to said runner and guide vanes for the flow passing therethrough, and said vanes being so arranged that when in open position their inner ends terminate at a substantially common curved line which is disposed eccentrically with respect to the runner axis and successive ones of said vanes being spaced apart with respect to the runner axis at progressively increasing and decreasing distances measured circumferentially in passing around the vane circle.

17. In a hydraulic machine having a laterally curved velocity decelerating draft tube turning the flow through substantially 90°, a runner, and a circumferentially arranged set of pivotal guide vanes on the inlet side of said runner disposed so as to direct and control the distribution of flow to said runner and adapted to be closed against each other in identical angular positions with respect to a radius drawn from the runner axis to each vane and when opened to an increasing extent to progressively increase the variation of angles and openings of the vanes around the circumference.

18. In a hydraulic machine having an elbow draft tube turning the flow through substantially 90°, a runner, and a circumferentially arranged set of guide vanes on the inlet side of the runner, arranged so as to provide a point of maximum opening lying on the side of the runner axis toward the side walls of the draft tube elbow and a point of minimum opening on the opposite side with progressively increasing openings in passing from the vanes which provide the minimum opening to the vanes which provide the maximum opening, the vanes which form such points of maximum and minimum openings being displaced from the central plane of the elbow in a direction opposite to the runner rotation.

LEWIS FERRY MOODY.